United States Patent [19]

Rubinstein

[11] Patent Number: 4,811,209
[45] Date of Patent: Mar. 7, 1989

[54] CACHE MEMORY WITH MULTIPLE VALID BITS FOR EACH DATA INDICATION THE VALIDITY WITHIN DIFFERENT CONTENTS

[75] Inventor: Jonathan J. Rubinstein, Cupertino, Calif.

[73] Assignee: Hewlett-Packard Company, Palo Alto, Calif.

[21] Appl. No.: 892,512

[22] Filed: Jul. 31, 1986

[51] Int. Cl.$^4$ .............................................. G06F 12/08
[52] U.S. Cl. ..................................................... 364/200
[58] Field of Search ... 364/200 MS File, 900 MS File

[56] References Cited

U.S. PATENT DOCUMENTS

| | | | |
|---|---|---|---|
| 4,504,902 | 3/1985 | Gallaher et al. | 364/200 |
| 4,525,778 | 6/1985 | Cane | 364/200 |
| 4,602,368 | 7/1986 | Circello et al. | 364/900 |
| 4,612,612 | 9/1986 | Woffinden et al. | 364/200 |
| 4,638,454 | 1/1987 | Waterworth | 364/900 |
| 4,654,819 | 3/1987 | Stiffler et al. | 364/900 |

OTHER PUBLICATIONS

Lin–"Fast Purging for an Array Table", IBM TDB, vol. 23, No. 3, Aug. 1980, pp. 1128–1133.

Primary Examiner—Raulfe B. Zache
Assistant Examiner—Thomas C. Lee
Attorney, Agent, or Firm—Edward L. Miller

[57] ABSTRACT

Each entry in a cache memory located between a processor and an MMU has two valid bits. One valid bit is associated with the user execution space and the other with the supervisor or operating system execution space. Each collection of valid bits can be cleared in unison independently of the other. This allows supervisor entries in the cache to survive context changes without being purged along with the user entries.

3 Claims, 8 Drawing Sheets

FULLY ASSOCIATIVE CACHE

THE DARK ARROWS ARE DATA LINES WHILE THE
LIGHT ARROWS ARE ADDRESS INFORMATION

SYSTEM MEMORY ORGANIZATION

DIRECT MAP CACHE

FULLY ASSOCIATIVE CACHE

SET ASSOCIATIVE CACHE

DIRECT MAP CACHE

CACHE MEMORY WITH MULTIPLE VALID BITS FOR EACH DATA INDICATION THE VALIDITY WITHIN DIFFERENT CONTENTS

BACKGROUND OF THE INVENTION

A small high speed local buffer known as a cache memory is often used to allow a high speed processor to operate at or near its maximum rate with a slower speed main memory. The cache saves the most frequently or most recently used contents of the main memory. When the processor accesses memory it is possible that the needed data or instruction is in the cache and that a longer main memory access can be avoided, thus increasing system performance. FIG. 1 illustrates a typical block diagram for a processor system using a cache memory.

Three major factors affect the performance improvement a cache can provide: the hit rate, the cache access time, and the miss penalty time. A hit occurs when an access can be completed out of the cache and an access to the main memory is not required. The hit rate is the number of accesses that can be completed in the cache divided by the total accesses. The cache access time is how long it takes to fetch data from the cache. Finally, the miss penalty is how long it takes to access data from the main memory and update the cache when there is not a cache hit.

Cache Organization

The hit rate of a cache is dependent on its size and organization. Cache sizes typically range from 256 bytes up to 256 Kbytes. As a general rule, the larger the cache, the higher the hit rate. A cache is divided into two portions; a data portion for storing data and a tag portion for storing the address of where in main memory the data belongs. "Cache size" refers to the data portion.

Two aspects of cache organization that determine the hit rate are the line size and the set size. The line size is the number of bytes that are transferred from the main memory to the cache when a miss occurs. As line size increases the hit rate tends to increase as well, since a form of prefetching is occurring. Unfortunately, as the line size increases either the cost or the miss penalty increases as well. To support larger line sizes, either the data path to memory increases (which raises the cost), or multiple transfers (known as block transfers) must occur (which increases the miss penalty).

The set size of a cache is defined by its associativity. Referring to FIG. 2, a fully associative cache allows all possible memory locations to be stored in any location in the cache. A practical implementation of this type of cache requires a tag comparator for each entry in the cache, making it both large and expensive. Fully associative cache memories typically have a small number of entries and are fabricated as complete integrated circuits.

To reduce the number of comparators and the size of the tags, a set associative cache is frequently used, as shown in FIG. 3. With this organization, a portion of the address is used to index into the tags, thus reducing the number of comparators required. The data is retrieved from the data portion of the entry associated with the tag that hit.

The minimum configuration for a set associative cache is termed direct mapped; see FIG. 4. In this configuration, only one comparator is used and the cache entry is selected by a portion of the address. A direct mapped cache is the least expensive possible implementation; however, for a given size it has the lowest hit rate. For a given cache size, the highest hit rate can be achieved with a fully associative cache.

Write and Replacement Policies

There are two commonly implemented methods for the cache to handle a write operation being executed by the processor: "write-through" and "copy-back." The write-through algorithm always updates main memory with the new data. If a cache entry contains old data from the same address, then the cache entry must be updated or invalidated; typically, it's updated. If there is no matching entry in the cache, then the cache may be updated or left undisturbed. The choice of whether or not to update the cache is usually based on whether data must be fetched from memory first, as in the case where the write is smaller than the line size. If a memory fetch is required, it is not advantageous to update the cache.

Since all writes require a memory access, a write must be considered a cache miss. The maximum potential hit rate of a write-through cache is bounded by the percent of processor accesses that are reads. Some of the miss penalty for a write can be reduced by adding a write buffer which allows the write to memory to occur in parallel with the processor's next access.

A copy-back cache allows the processor to execute a write access to the cache. Thus, the main memory is not updated until a later time when a "dirty" or written entry is needed for replacement. Naturally, if a write occurs to a copy-back cache when the size of the write is less than the line size, the line must be fetched from memory before the cache is updated unless it already resides in the cache.

Since the hit rate of a copy-back cache is not bounded by the percent of reads, it is higher than in the write-through case. However, since a write may have to occur whenever a miss occurs (if the entry is dirty) and many write accesses require a read from memory, the miss penalty tends to be higher.

In general, a write-through cache is much easier to implement for a reasonable cost, and the copy-back cache gives higher performance.

The replacement policy dictates which entry in the cache is overwritten when a miss occurs. In a direct mapped cache, the address defines which entry is replaced. In a fully associative cache, there are many possible algorithms for replacement such as LRU (Least Recently Used), FIFO (First In First Out), or random. Although LRU has the best hit rate, it is too difficult to implement in hardware and can require too long a period of time to execute. Since random is the easiest to implement, even though it tends to have the lowest hit rate, it is the most frequently used method, especially in a set associative cache.

Physical versus Logical Cache

In systems that include a memory management unit (MMU), address translation must occur for all accesses to physical memory. Although the address translation is typically done with tables in main memory, a local buffer for storing translations is used to provide reasonable performance. This translation buffer allows the logical address to be quickly translated into a physical address on a cycle by cycle basis, but unfortunately the translation still requires time.

A cache can be addressed with either the physical or logical processor address. If the physical address is used, the cache access time will be increased by the translation time unless the set associativity is such that the lower untranslated address bits can be used for a cache index. Since both the cache and the translation buffer are high speed buffers, the addition of the translation time can double the cache access time, lowering system performance significantly.

The other option is to use the logical address directly out of the processor to access the cache This organization allows the address translation to be executed in parallel instead of serially, and avoids increasing the cache access time.

The difficulty with a logical cache is that the cache must be kept consistent with the memory maps and physical memory The cache must be cleared (purged) whenever the memory maps change, when a switch in context occurs, or when there is DMA activity. This purging must be managed by the operating system, thus adding some degree of complexity.

The major problem with purging the cache is that immediately afterwards the instantaneous hit rate is decreased. Even though the instantaneous hit rate may in time recover, the average hit rate is nevertheless permanently lowered, thus lowering overall performance. An approach used to minimize the number of purges is to add a process identifier to the tag. This eliminates or reduces the requirement to purge on a context switch. Another approach is to equip each entry with a valid bit. The trade-off between the additional translation time of a physical cache and the decreased hit rate of the logicl cache must be weighed carefully by the system designer in order to maximize system performance.

SUMMARY OF THE INVENTION

Each entry in a logical cache memory located between a processor (CPU) and an MMU is equipped with both a user valid bit and a supervisor valid bit each indicating, during a user to supervisor context change, whether their associated entry in the cache actually equals the contents of memory. This affords a way to increase the hit rate for a logical cache memory in a general purpose computer. The increased hit rate allows a five to ten percent decrease in the execution time of both systems programming and user application programs. The exact degree of improvement is contingent upon the specific circumstances.

DESCRIPTION OF A PREFERRED EMBODIMENT

Figure 1:
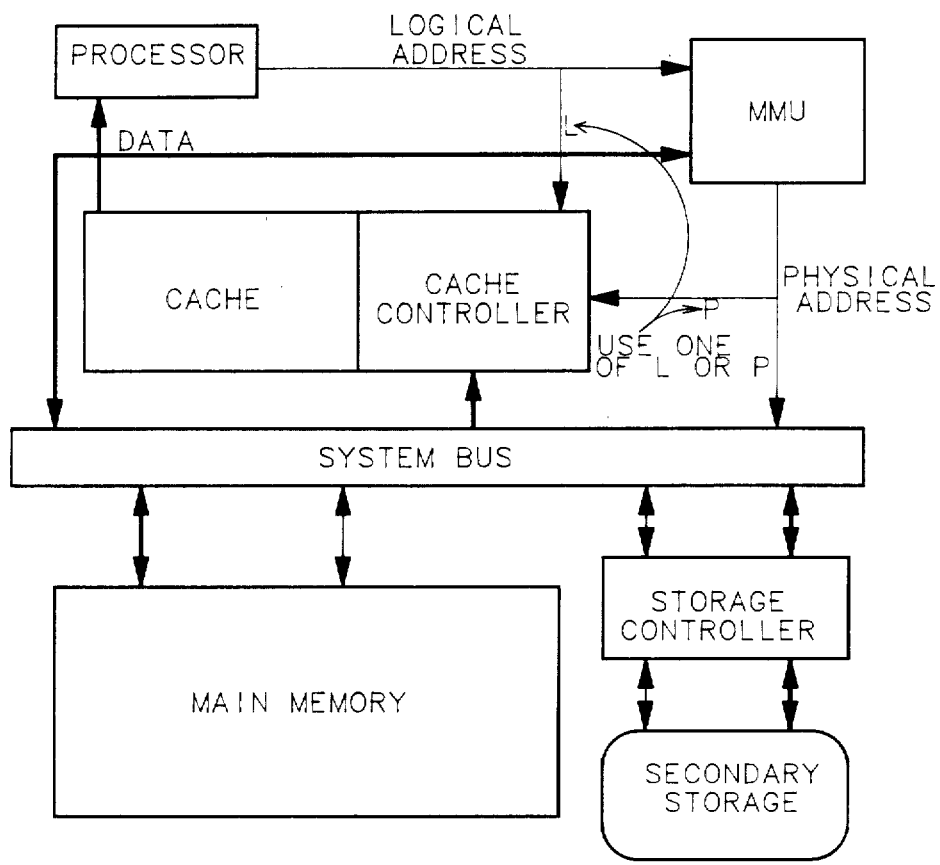
FIGS. 1-4 are simplified block diagrams of prior art cache memory schemes, each using a single valid bit.
Figure 2:
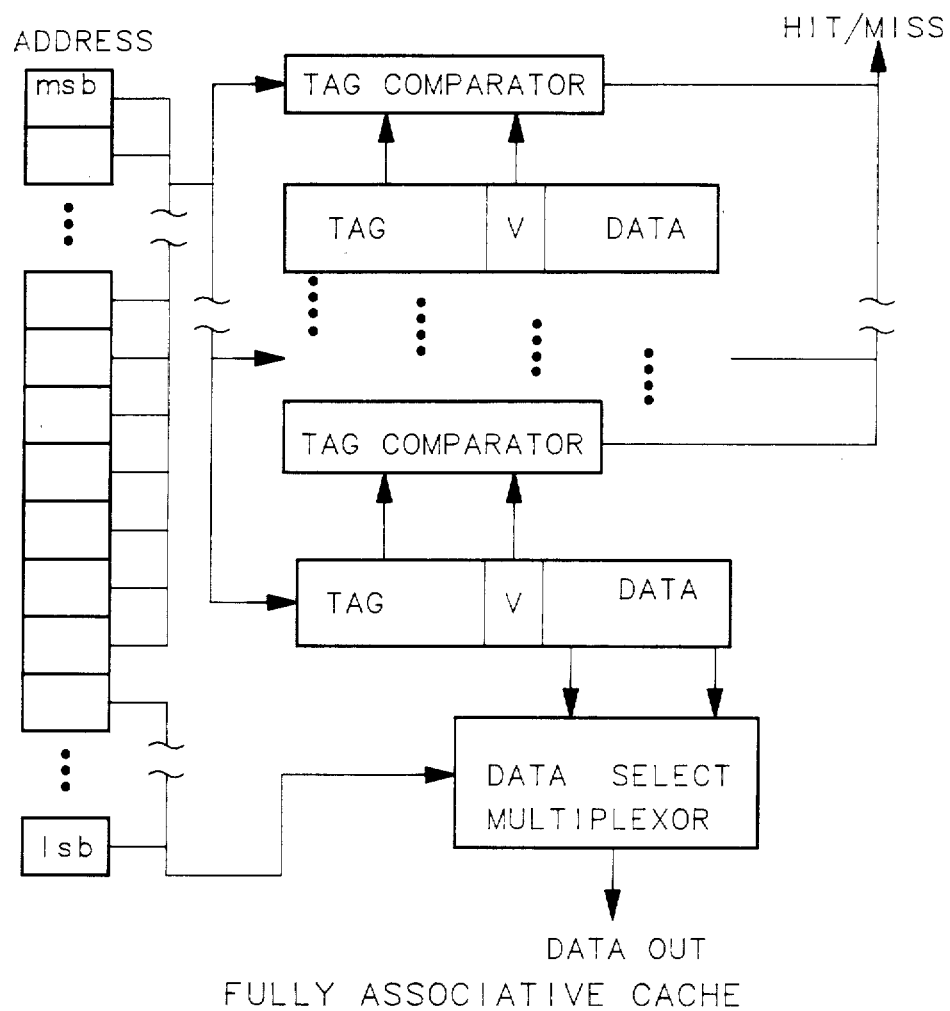
Figure 3:
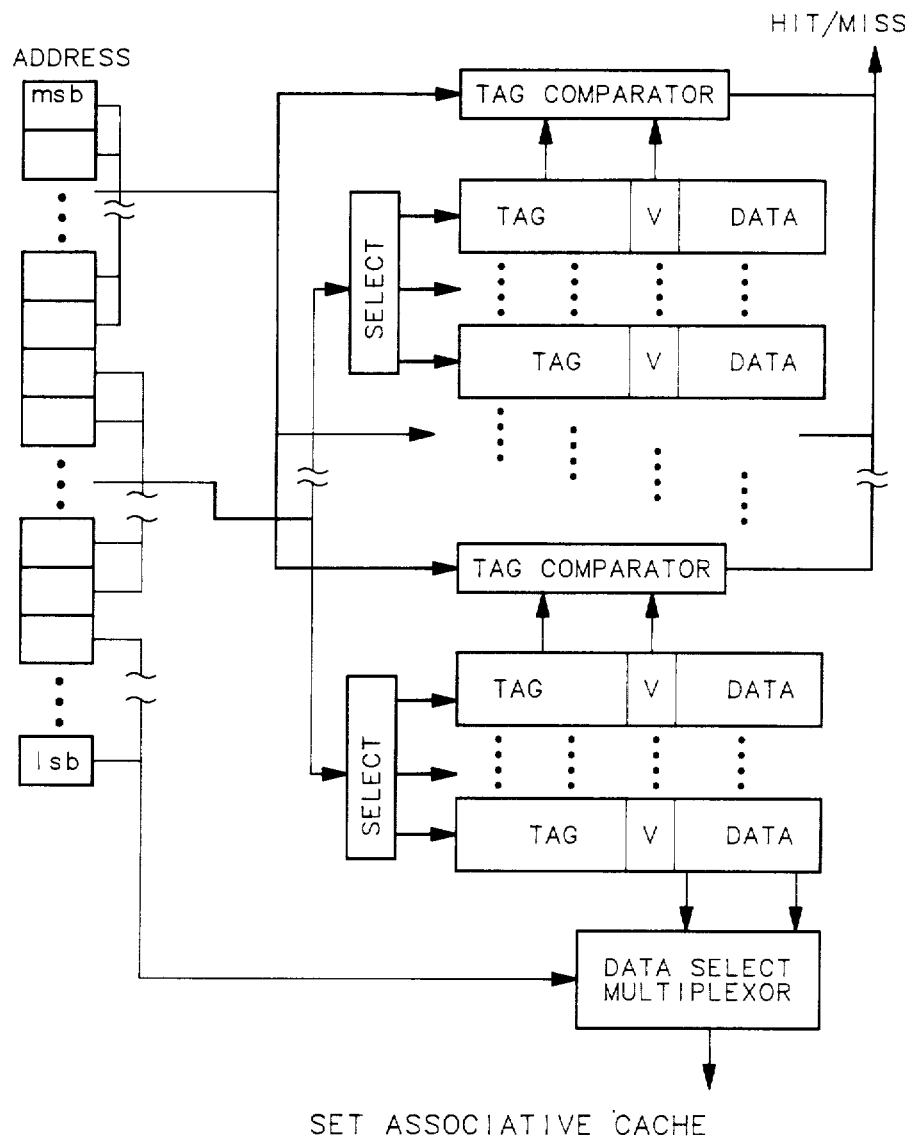
Figure 4:
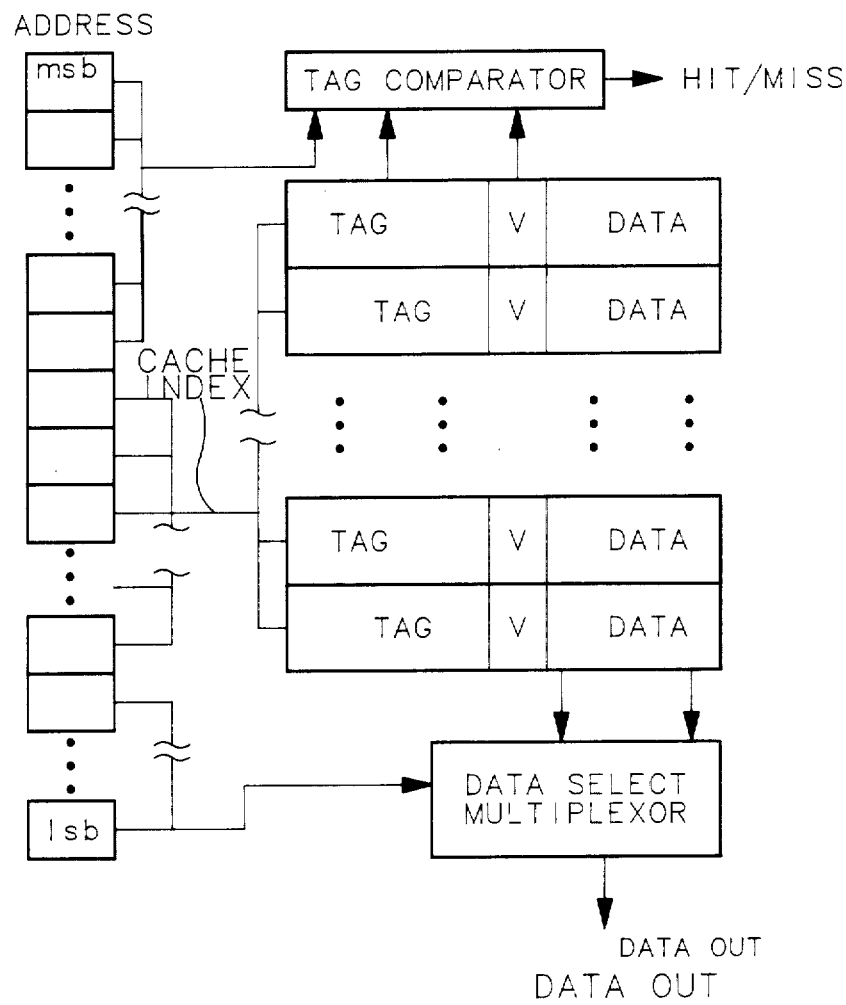
Figure 5:
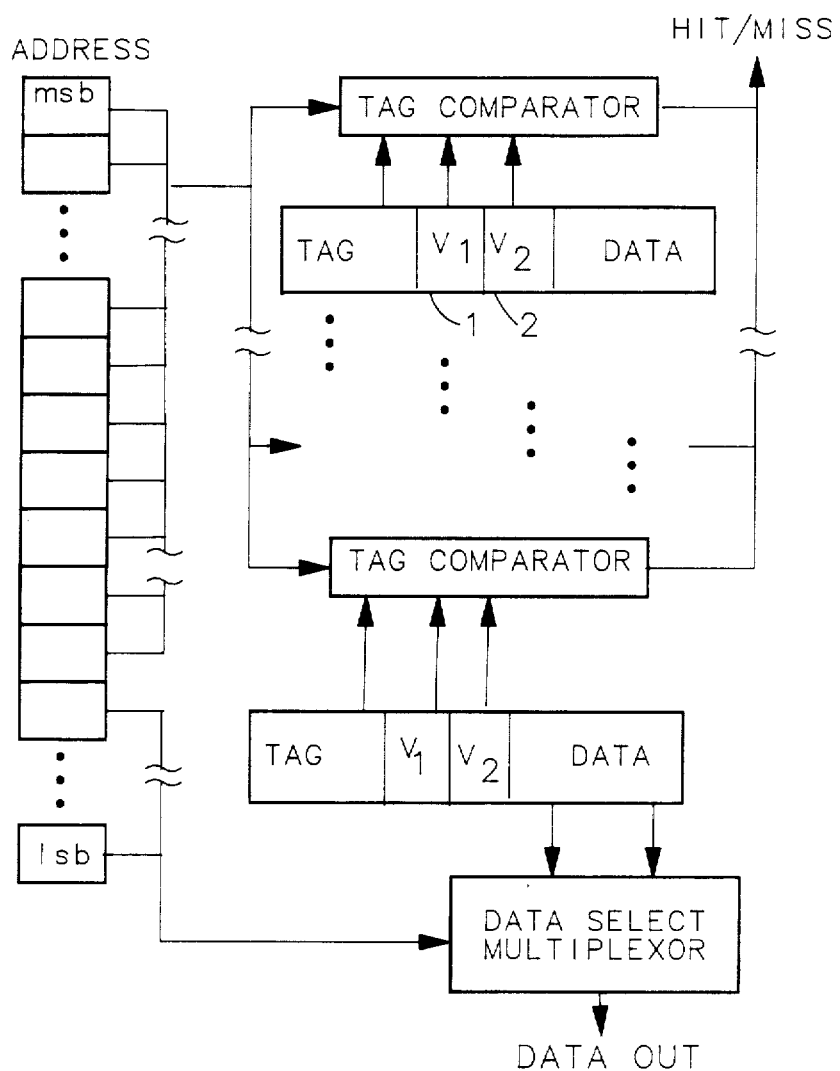
FIGS. 5-7 are simplified block diagrams of the cache memory schemes of FIGS. 2-4, modified to incorporate an extra valid bit to prevent unnecessary purging of supervisor entries prior to a context switch.
Figure 6:
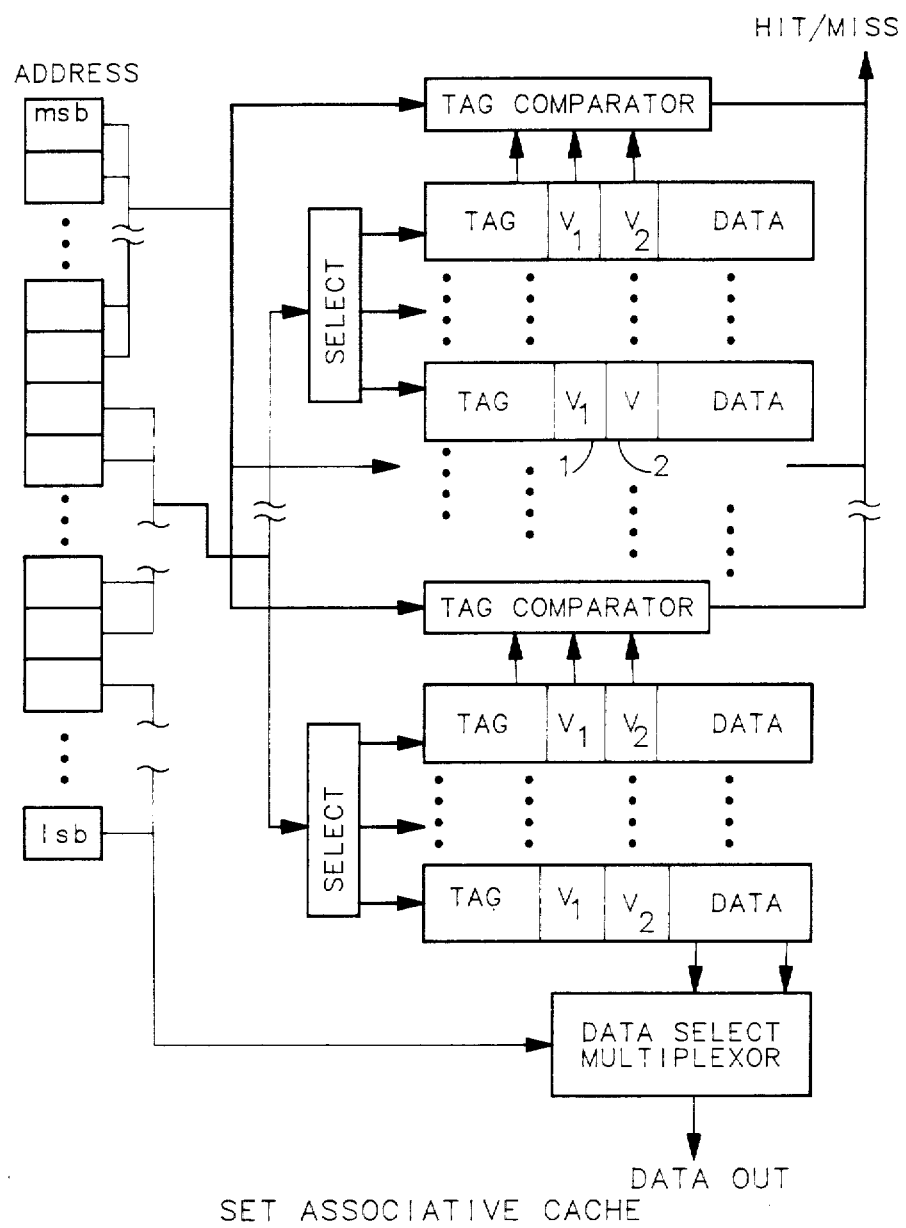
Figure 7:
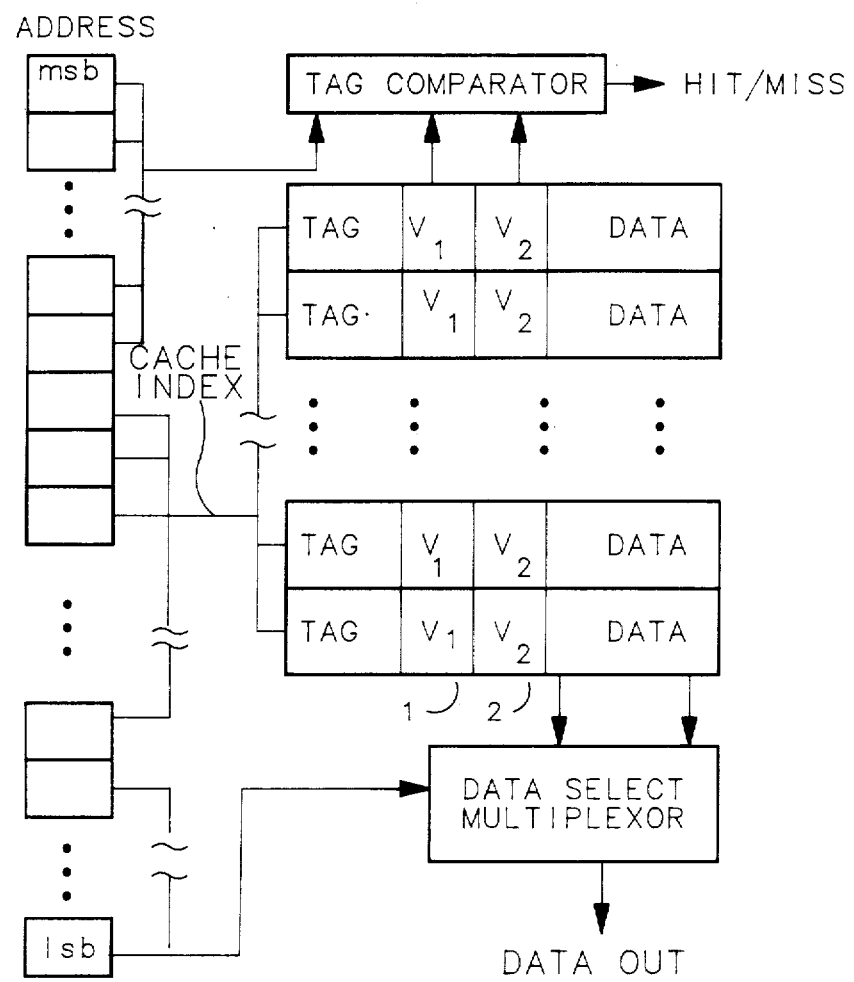

Referring now to FIGS. 5-7, shown there are improved versions of the "valid bit" technique for cache memories of the type appearing in FIGS. 2-4. In particular, in the arrangements of FIGS. 2-4 it is necessary to clear all the valid bits ahead of a context change. Such an action is called "purging." This is generally easy to do, since the cache memory can be constructed with those bits in an (n by one)-type memory chip that has an input that clears the entire chip. But the penalty appears later in performance when previously valid supervisor entries needed again produce misses, and the accompanying fetch from main memory recreates corresponding new entires. In distinct contrast, the technique of FIGS. 5-7 allows a purge prior to a context switch to invalidate the user entries, and leave the supervisor entries intact.

Specifically, in FIGS. 5-7 there are two valid bits $V_1$ and $V_2$ (1 and 2). Notice also that both valid bits 1 and 2 are coupled to their associated comparators. What is done with the two valid bits will be described in more detail in connection with FIG. 8. At this point it will be understood that each collection of valid bits $V_1$ and $V_2$ can be independently cleared in unison after the fashion described in the preceeding paragraph. The action of clearing the valid bits is controlled by the supervisor itself (i.e., by the operating system). Generally speaking, the collection of valid bits (say, $V_2$) corresponding to the supervisor's cache entries will seldom need to be purged. A variety of well known circumstances may cause purging of the other collection of valid bits corresponding to the user's memory space. In particular, these include the context switches of changing from executing supervisor code to executing user code, and vice versa. A context switch from supervisor to a new or different user, or one from one user to another, will cause a change in the MMU mapping, and will almost certainly require purging of the collection of user valid bits. Again, these events are known by the operating system, and very little extra overhead is required to put the necessary purging into effect.

Lest the point be lost, the operating system will generally never purge the supervisor entires. When in the user context, supervisor entries may be overwritten because they occupy needed space in the cache. That's the breaks. But not having been deliberately purged, if they are not overwritten they are still available for immediate use after a user to supervisor context switch. It is this potential "permanence" of the supervisor entries that give rise to increased system performance.

Figure 8:
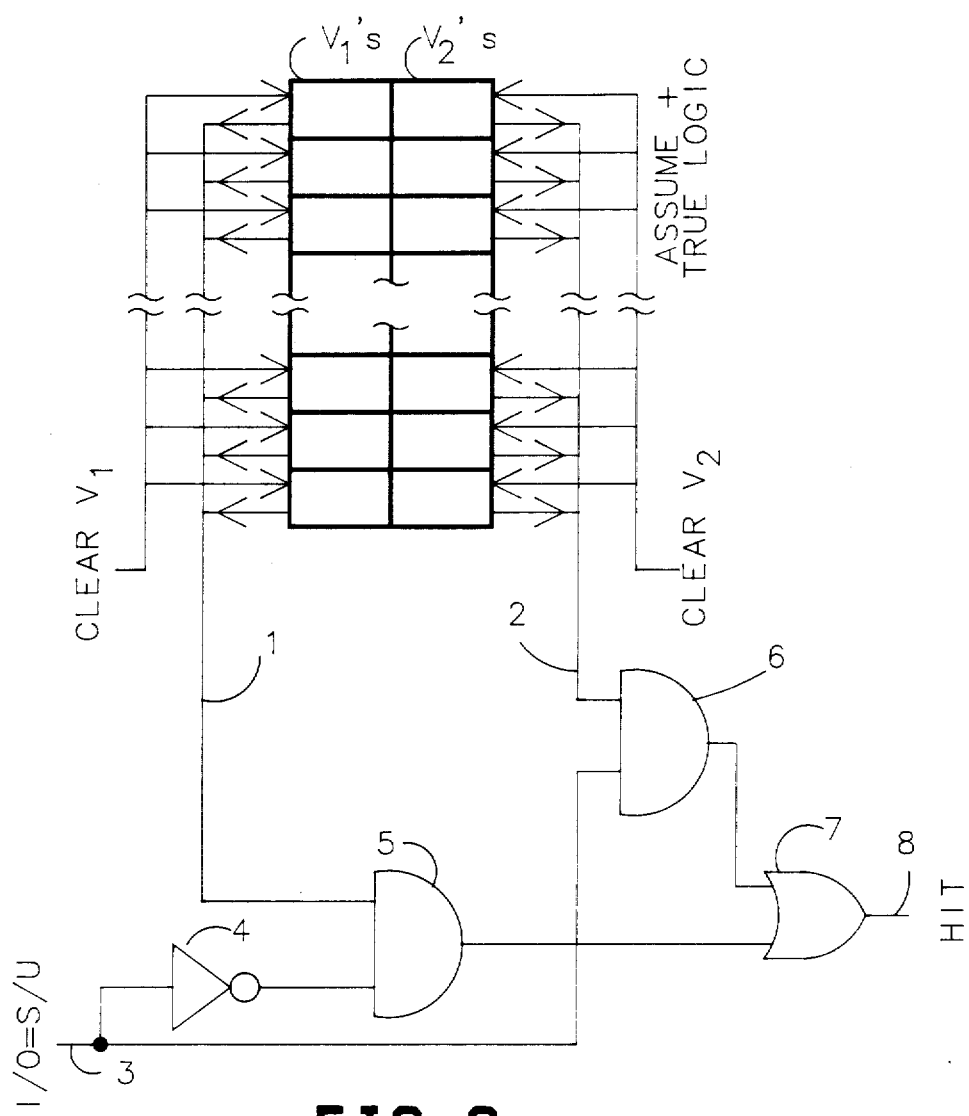
FIG. 8 is a simplified schematic indication of how the plurality of valid bits in FIGS. 5-7 are utilized in determining whether or not there has been a hit.

FIG. 8 illustrates how valid bits $V_1$ and $V_2$ are used by the comparator circuitry in the determination of whether or not there has been a hit. The signal S/U 3 indicates (say, with positive true logic) whether the present context is Supervisor (S) or User (U). The signal S/U 3 is supplied by circuitry (not itself shown) responsive to instructions issued to it by the processor at the behest of the operating system.

Assume that the present context is Supervisor. Then signal S/U 3 is true, supplying one true input to one input of AND gate 6. Inverter 4 produces a false as one input to AND gate 5, so that the state of the user valid bit $V_1$ will not contribute to determining the state of the output signal HIT 8. With S/U true that determination is made by the value of the supervisor valid bit $V_2$. The situation with respect to $V_1$/gate 5 and $V_2$/gate 6 is essentially reversed when S/U is false. OR gate 7 forms the logical disjunction of the outputs of gates 5 and 6 to produce the signal HIT 8.

It will be understood that, depending upon the particular cache memory architecture used (e.g., which of FIGS. 5-7), either more selection is needed to extract the particular $V_1$ and $V_2$ of interest, or the circuit of FIG. 8 is repeated for different instances of $V_1$ and $V_2$ with combinational logic performed upon the several outputs of gates 7 to produce the ultimate HIT/MISS signal shown in FIGS. 2–7. Both of these cases might obtain, also.

The above described technique for using multiple valid bits may be applied to cache memories of both the write-through type and the copy-back type.

I claim:

1. A cache memory for a computer that accesses memory in a first context during the execution of a first program and in a second context during the execution of a second program, the cache memory comprising:

a collection of addressable memory locations, each location of which is apportioned into a data memory portion paired with a tag memory portion;

means for addressing the addressable memory locations;

a first valid bit within each tag memory portion and representing the validity within the first context of the content of the data memory portion paired therewith;

a second valid bit within each tag memory portion and representing the validity within the second context of the content of the data memory portion paired therewith;

means for simultaneously clearing each first valid bit in response to a change in the first context;

means for simultaneously clearing each second valid bit in response to a change in the second context; and means coupled to the first and second valid bits and responsive to a selection signal, for producing an output indicative of the state of the selected valid bit for the addressed tag memory portion.

2. A cache memory as recited in claim 1 wherein the first context comprises the execution of object code for an operating system and the second context comprises the execution of another program.

3. A cache memory as recited in claim 2 wherein each of the means for simultaneously clearing is responsive to a respective instruction issued by the operating system.

* * * * *